(12) United States Patent
Yang (10) Patent No.: US 8,087,774 B2
(45) Date of Patent: Jan. 3, 2012

(54) SIDE SHIELD FOR EYEWEAR

(75) Inventor: Seng Dae Yang, Gumi-Si (KR)

(73) Assignees: Won Sik Kim, Daegu (KR); Jun Woo Park, Daegu (KR)

( * ) Notice: Subject to any disclaimer, the term of this patent is extended or adjusted under 35 U.S.C. 154(b) by 69 days.

(21) Appl. No.: 12/783,342

(22) Filed: May 19, 2010

(65) Prior Publication Data

US 2010/0296046 A1 Nov. 25, 2010

(30) Foreign Application Priority Data

May 21, 2009 (KR) .................... 20-2009-0006126 U
May 21, 2009 (KR) .................... 20-2009-0006128 U (51) Int. Cl.
*G02C 7/10* (2006.01)

(52) U.S. Cl. .................................... 351/44; 2/13; 2/449

(58) Field of Classification Search .................... 351/41, 351/44, 111, 121; 2/13, 448–451
See application file for complete search history.

(56) References Cited

U.S. PATENT DOCUMENTS 5,798,815 A * 8/1998 Hirschman et al. ............. 351/44

2005/0162609 A1 * 7/2005 Jung ............................... 351/44

* cited by examiner

Primary Examiner — Huy K Mai
(74) Attorney, Agent, or Firm — Lowe Hauptman Ham & Berner LLP (57) ABSTRACT

Disclosed is a side shield which can be easily assembled with and separated from the eyewear temple, identically widen together with the eyewear temple, and prevent the external impact from being transferred to and reaching the eyewear. The side shield includes a shield body surrounding a hinge, through which an eyewear temple is connected with an eyewear frame of an eyewear, and covering a side space of the eyewear frame, to prevent foreign substances from entering the eyes, the shield body including blocking wings formed at an upper part and a lower part of the shield body, and a coupling means for maintaining a coupling state between the shield body and the eyewear temple, the coupling means being provided at the shield body and including a coupler assembled with the eyewear temple and a fastener for fastening the coupler. Therefore, the side shield is easily detachable and further includes the elastic means, to improve the wearing comfort.

8 Claims, 7 Drawing Sheets

SIDE SHIELD FOR EYEWEAR

BACKGROUND OF THE INVENTION

1. Field of the Invention

The present invention relates to a side shield for an eyewear. More particularly, the present invention relates to an improved detachable side shield for an eyewear, which can block foreign substances from entering through an eyewear temple and an eyewear frame and protect the eyes of a wearer.

2. Description of the Prior Art

In order to block foreign substances generated and scattered during the work in various industry fields, a worker has worn a protective eyewear, in particular, a goggle-type protective eyewear, having various shapes and constructions.

However, if the wearer of the eyewear is weak in sight, the wearer cannot wear the goggle-type protective eyewear while wearing his/her regular eyewear. Further, the protective eyewear other than the goggle type has a wide gap between the temple and the frame of the eyewear, so that the foreign substances are scattered and enter the space between the eyewear and the eyes of the wearer, thereby becoming a cause for damaging the eyes of the worker.

In order to solve the above problems, a side shield has been developed and used, which is detachable from the eyewear of the worker and prevents the foreign substances from entering the eyes through a side part of the eyewear. The aforementioned side shield is representatively disclosed in Korean Utility Model Application Nos. 20-2004-0002017 and 20-2005-0030087. In particular, Korean Utility Model Application No. 20-2004-0002017 has the construction in which the side shield surrounding the eyewear temple has a through hole formed at an upper and lower part of an inside of a rear part of the side shield and a fastener including an elastic fragment in an internal side of the fastener and a hook part formed at an upper and lower part of a front end of the fastener is inserted through an opening part of the side shield, and the hook part of the fastener is assembled with the through hole, so that the elastic plate of the fastener is in close contact with the eyewear temple.

Further, in order to overcome of the problems of the Korean Utility Model Application No. 20-2004-0002017, Korean Utility Model Application No. 20-2005-0030087 has the construction in which a fastener is rotated in 90° using a driver and then the fastener is separated through grapping and pulling the fastener using pliers or a long nose.

The prior art of Korean Utility Model Application No. 20-2004-0002017 has a structure in which the hook part of the fastener is inserted in the through hole formed at the side shield from the inside to the outside, so that it is very inconvenient to separate the fastener for separating the side shield. That is, this is because that, in order to separate the fastener, the wearer separates the fastener through pulling the fastener using one hand holding one tool while pressing the elastic plate of the fastener using the other hand holding another tool.

Further, in Korean Utility Model Application No. 20-2005-0030087, the fastener is separated using the pliers, etc., after the rotation of the fastener using the driver, so that it needs two tools and thus fails to solve the inconvenience.

Further, a hinge part of the eyewear can outwardly widen for the wearing easiness, but the side shield does not allow the eyewear temple to outwardly widen when the side shield is assembled with the eyewear temple, so that it is inconvenient to wear the eyewear.

Especially, because the eyewear temple does not outwardly widen, it strongly presses a side of the face of the wearer having the physicality of a large face, so that there are various inconveniences, such as creation of the serious pain and deterioration of the wearing comfort.

SUMMARY OF THE INVENTION

Accordingly, the present invention has been made to solve the above-mentioned problems occurring in the prior art, and the present invention provides a side shield for an eyewear including: a shield body surrounding a hinge, through which an eyewear temple is connected with an eyewear frame of an eyewear, and covering a side space of the eyewear frame, to prevent foreign substances from entering the eyes, the shield body including blocking wings formed at an upper part and a lower part of the shield body; and a coupling means for maintaining a coupling state between the shield body and the eyewear temple, the coupling means being provided at the shield body and including a coupler assembled with the eyewear temple and a fastener for fastening the coupler, wherein the coupler includes a guide groove formed at an inner surface of the shield body, the eyewear temple being slidably assembled with the guide groove, temple support parts formed at upper and lower inner surfaces of a rear part of the guide groove while being spaced from and facing each other, the temple support parts being in contact with a widthwise edge of the eyewear temple slidably assembled with the guide groove, so as to support the eyewear temple, and a latching jaw formed within an upper part of the temple support part to hold the fastener assembled with the coupler within the shield body, and the fastener includes slots formed at both sides of a fastener body, a fastening arm protruding with an elasticity from the slots, and a latching hook formed at an end of the fastening arm and latched by the latching jaw, to prevent the shield body from being separated from the eyewear temple. Therefore, the side shield can be easily assembled with and separated from the eyewear temple, the side shield can identically widen together with the eyewear temple, and the side shield can prevent the external impact from being transferred and reaching the eyewear.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, preferred constructions and functions of the present invention for achieving the objects will be described in detail with reference to the accompanying drawings.

Figure 1:
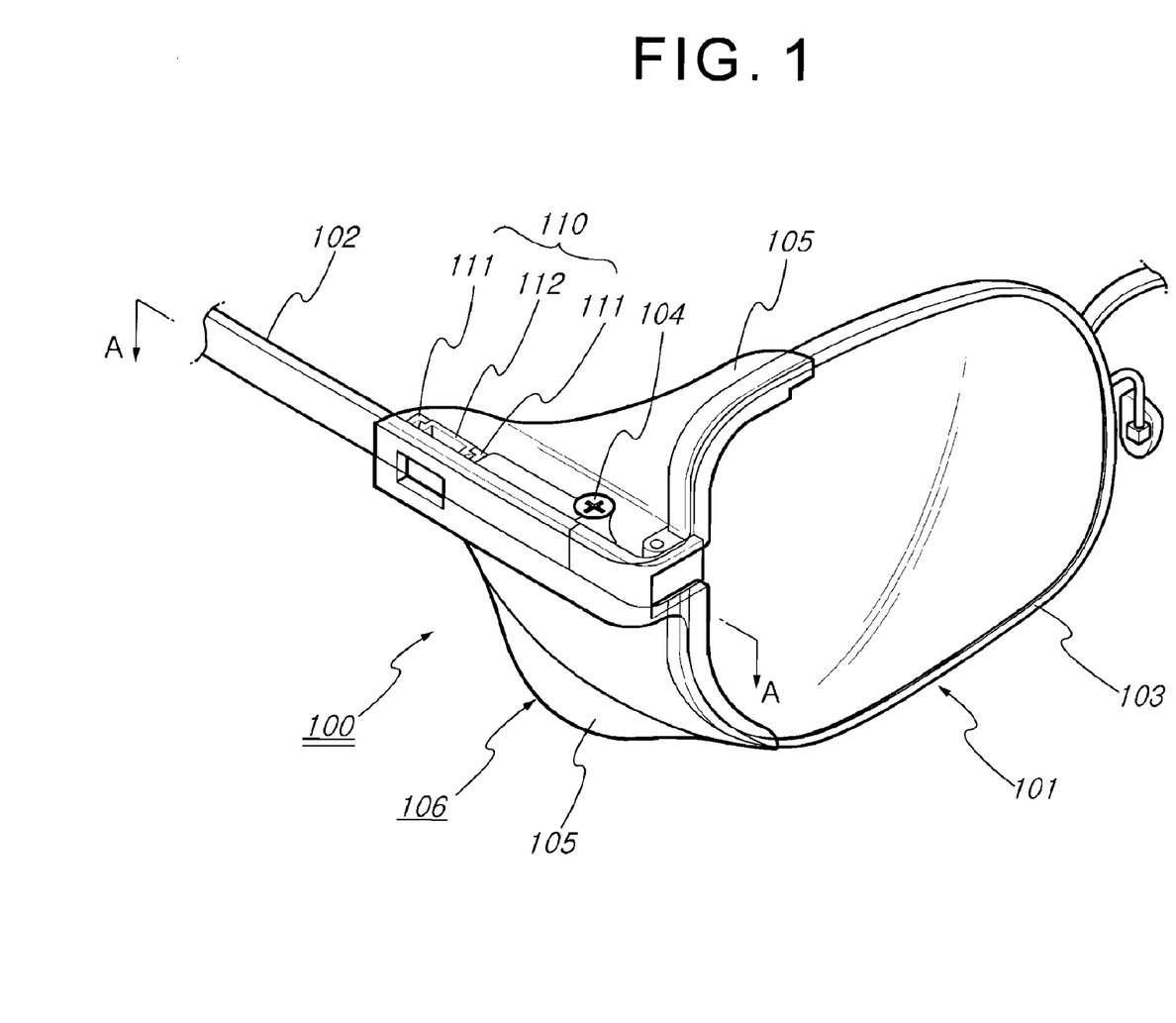
FIG. 1 is a perspective view illustrating the state in which a side shield is assembled with an eyewear according to a first embodiment of the present invention.
Figure 2:
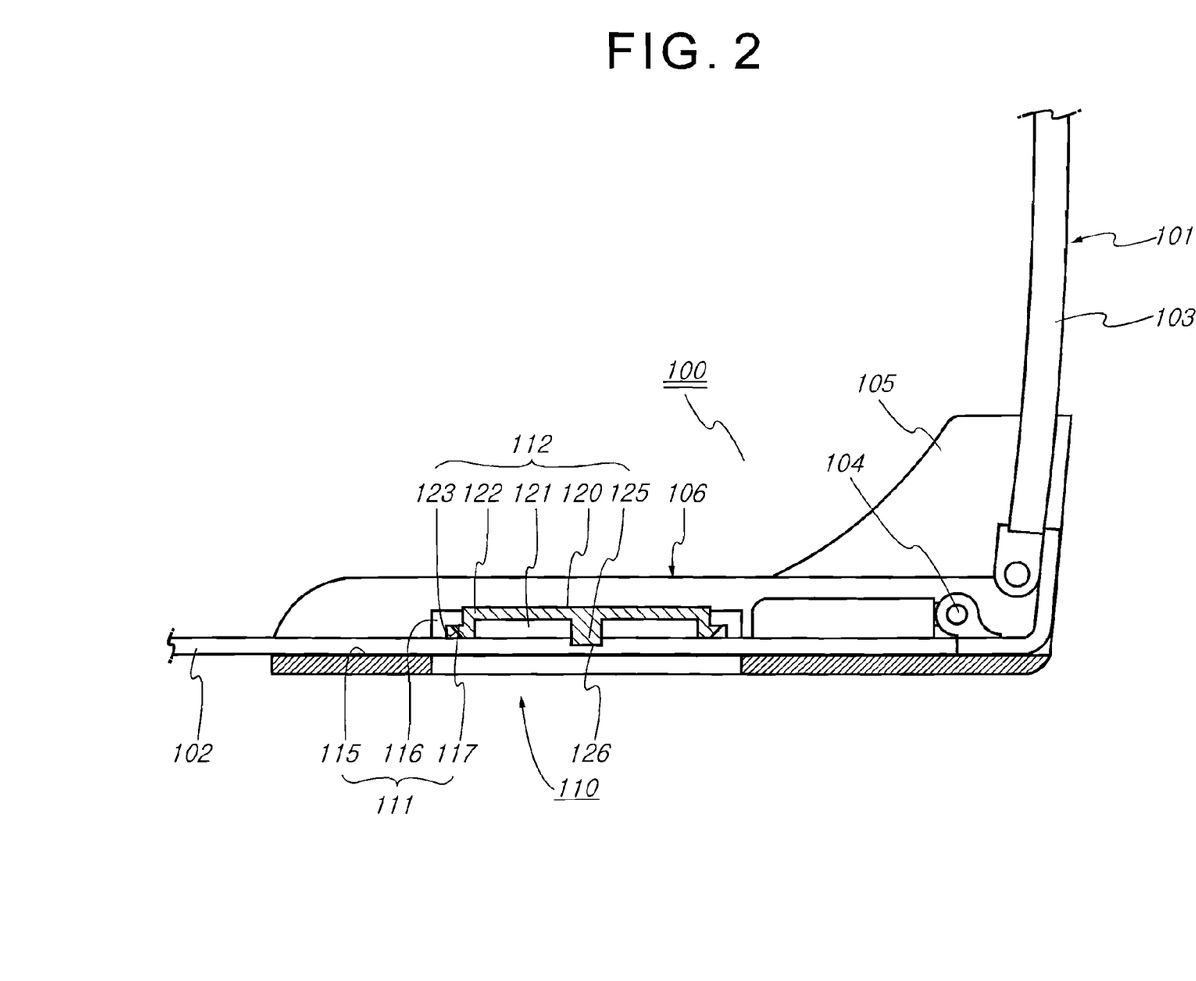
FIG. 2 is a cross-sectional view illustrating a side shield taken along line A-A according to a first embodiment of the present invention.

FIGS. 1 and 2 illustrate an embodiment of the present invention, respectively.

A side shield 100 for an eyewear 101 of the present invention includes a shield body 106 made of a plastic material, which surrounds a hinge 104 interconnecting an eyewear temple 102 and an eyewear frame 103 of the eyewear 101 and covers a side space of the eyewear frame 103, to prevent foreign substances from entering the eyes. Further, the shield body 106 that is transparent or semi-transparent includes blocking wings 105 in an upper part and a lower part of the shield body 106.

The eyewear 101 according to the present invention has the shape capable of employing the hinge 104 having various shapes and constructions. The hinge 104 can employ various hinges, such as a hinge having a conventional pivot pin and a hinge having a repulsion spring (not shown).

The shield body 106 includes a coupling means 110 for coupling the shield body 106 with the eyewear temple 102. The coupling means 110 includes a coupler 111 assembled with the eyewear temple 102 and a fastener 112 for fastening the coupler 111. The coupler 111 includes a guide groove 115 formed at an inner surface of the shield body 106 and the eyewear temple 102 is slidably assembled with an inside of the shield body 106 through the guide groove 115. The coupler 111 includes two pairs of temple supporting parts 116 that are spaced apart from each other in the upper and lower surfaces of an inside of a rear part of the guide groove 115 while facing each other so that the temple support parts 116 are in contact with a widthwise edge of the eyewear temple 102 that is slidably assembled with the guide groove 115, so as to support the eyewear temple 102.

Further, the coupler 111 includes a latching jaw 117 integrally formed with the temple support part 116 within an upper part of the temple support part 116, so that the latching jaw 117 holds the fastener 112 assembled with the coupler 111 within the shield body 106, thereby achieving the firm coupling between the eyewear temple 102 and the shield body 106.

The fastener 112 includes slots 121 at both sides of a fastener body 120 and a fastening arm 122 having elastic force that protrudes from the slots 121. The fastening arm 122 includes a latching hook 123 formed at an end of the fastening arm 122 and latched by the latching jaw 117, to prevent the shield body 106 from being easily separated from the eyewear temple 102.

Further, the fastener 112 includes a pressing projection 125 in an inside of a center part of the fastener body 120, so that the pressing projection 125 is fitted in a pressing groove 126 formed at the eyewear temple 102, to prevent the assembled eyewear temple 102 from easily moving.

Figure 3:
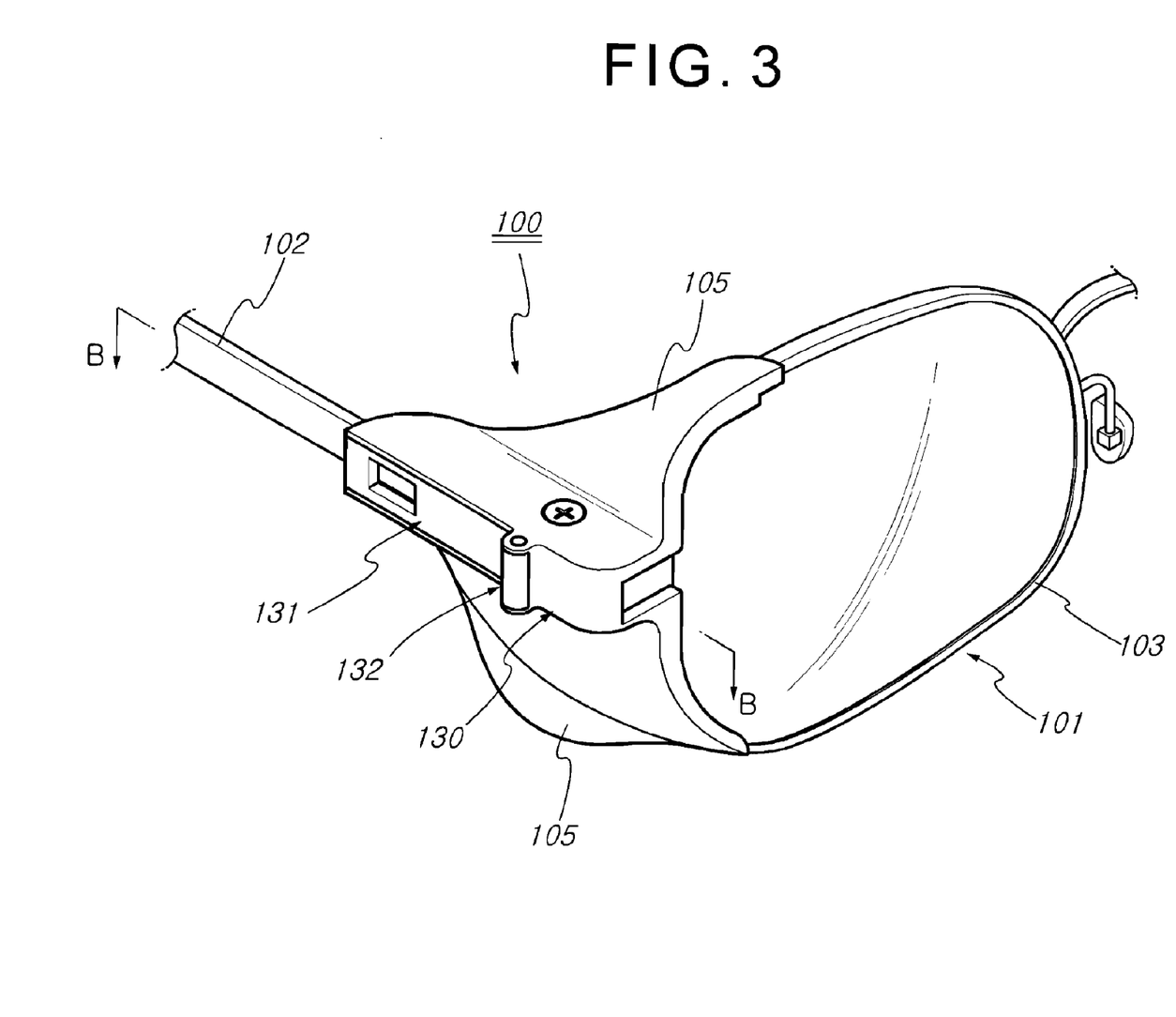
FIG. 3 is a perspective view illustrating the state in which a side shield is assembled with an eyewear according to a second embodiment of the present invention.
Figure 4:
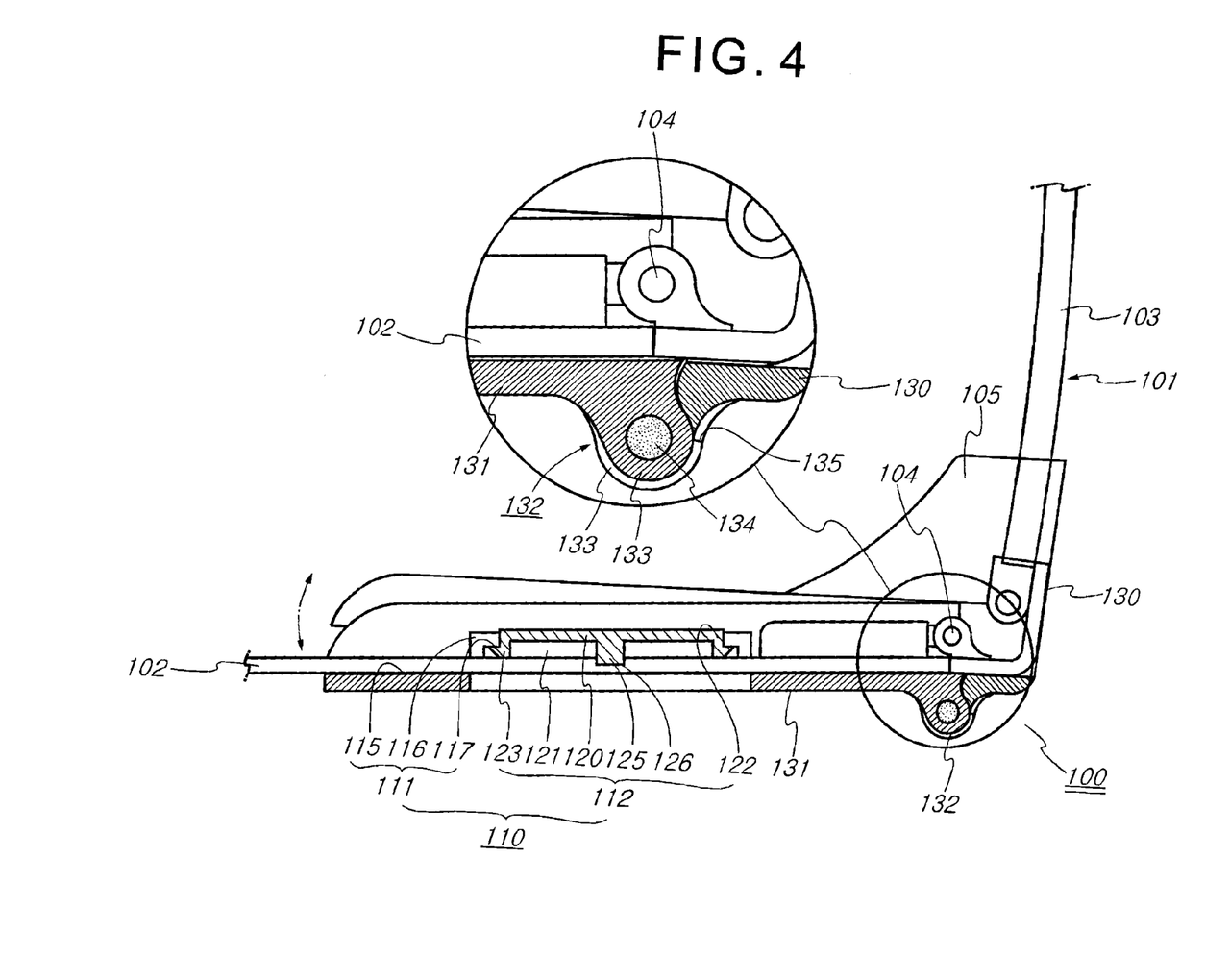
FIG. 4 is a cross-sectional view illustrating a side shield taken along line B-B according to a second embodiment of the present invention.

In another embodiment of the present invention, as shown in FIGS. 3 and 4, the shield body 106 includes a fixing body 130 that is in close contact with the eyewear frame 103 and does not move and a movable body 131 that is assembled with the eyewear temple 130 and freely widens outward together with the eyewear temple 102.

Further, the fixing body 130 is assembled with the movable body 131 by a conventional hinge body 132, which does not affect the movement of the movable body 131. It is preferred that the hinge body 132 is positioned in an identical line with the hinge 104 of the eyewear 101 so as to secure the identical operation performance together with the eyewear temple 102.

The hinge body 132 includes a hermaphrodite hinge bracket 133 and a hinge pin 134, and the hinge bracket 133 is engaged with the fixing body 130 and the movable body 131 and is then assembled with them by the hinge pin 134. The hinge bracket 133 has an integrally formed stopper 135 for controlling unnecessary extra widening when the movable body 131 and the hinge bracket 133 widen after contact between them.

Figure 5:
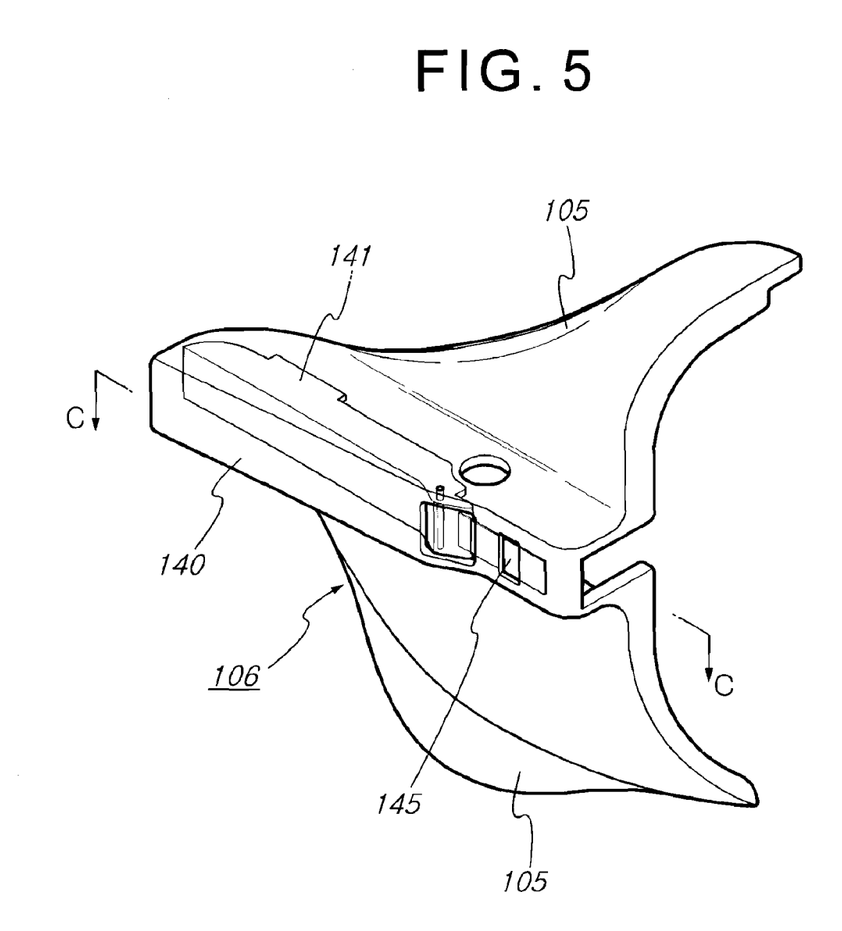
FIG. 5 is a perspective view illustrating the state in which a side shield is assembled with an eyewear according to a third embodiment of the present invention.
Figure 6:
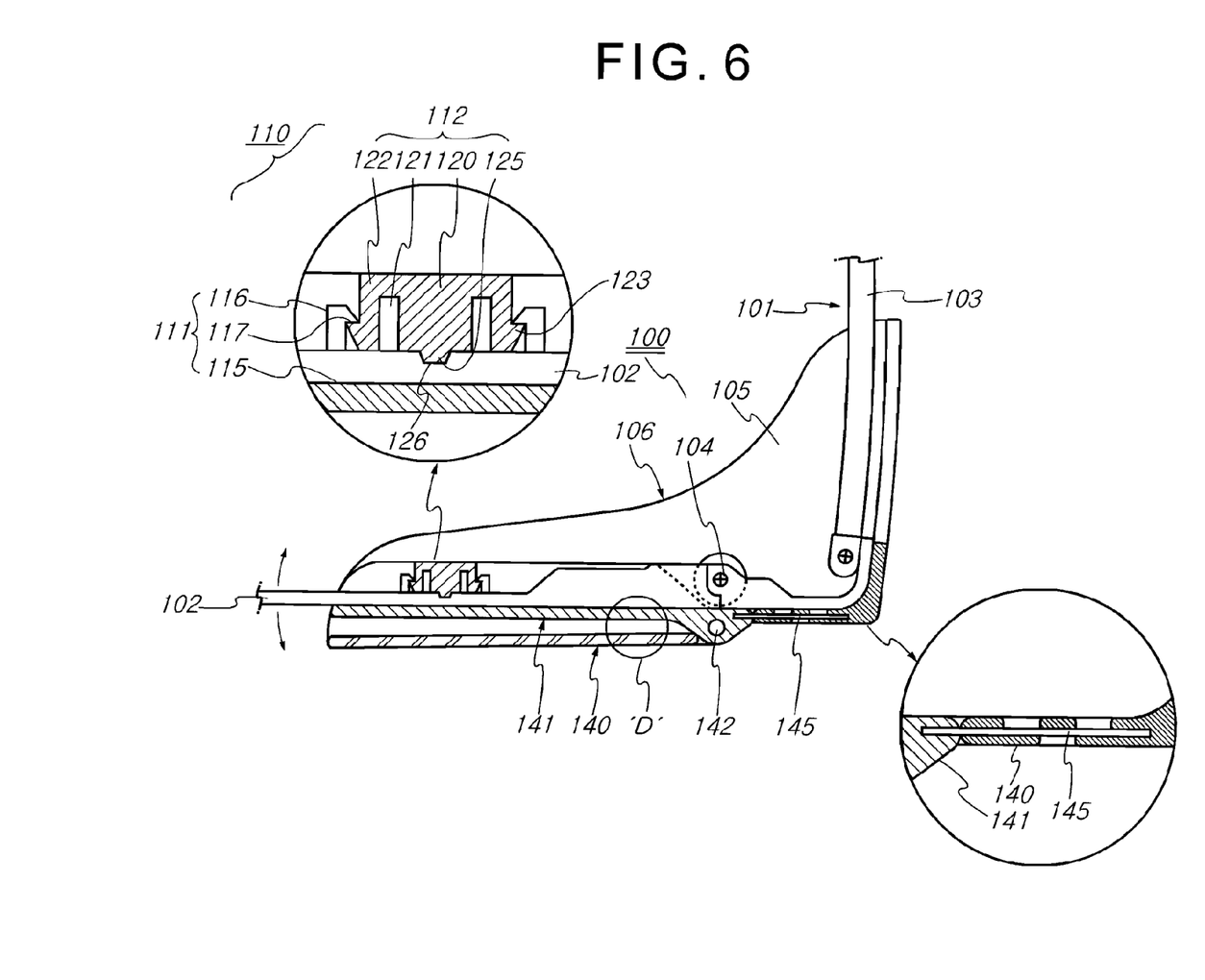
FIG. 6 is a cross-sectional view illustrating a side shield taken along line C-C according to a third embodiment of the present invention.

FIGS. 5 and 6 illustrate a modification of the embodiment of the present invention having an identical technical spirit.

The shield body 106 according to the present modified embodiment includes an outer body 140 that protects against outside impact and foreign substances and an inner body 141 that is coupled with an inside of the outer body 140 and is assembled with the eyewear temple 102, to freely widen outward together with the eyewear temple 102.

The outer body 140 includes the blocking wing 105 for preventing the entering of foreign substances, and the inner body 141 includes the coupler 111 and the fastener 112 and is coupled with the outer body 140 by the hinge 142, so that the inner body 141 freely moves with respect to the outer body 140.

A front end of the inner body 141 is connected with a front end of the outer body 140 by the hinge 142, and a rear end of the inner body 141 is spaced apart from the outer body 1410 in a predetermined distance, to prevent the interference between the outer body 140 and the inner body 141 during the widening of the eyewear temple 102.

Through such a construction, even though the face contours of the wearers and the shapes of the eyewear frames are various, the shield body 106 can be elastically repulsed with receiving the widening of the eyewear temple 102 of the wearer, so that it is possible to relieve the pain inflicted during the wearing of the eyewear and improve the wearing comfort.

To this end, an elastic member 145 is further provided at the front end of the body 140 and the inner body 141 for controlling the unnecessary movement of the inner body 141 with respect to the outer body 140.

The elastic member 145 provides the outer body 140 with elastic repulsion force with respect to the inner body 141. The elastic member 145 may have various shapes. For example, the elastic member 145 may employ a plate member or a spring having elastic force for connection between the inner body 141 with the outer body 140, or a hermaphrodite projection and projection groove for coupling the inner body 141 with the outer body 140.

FIG. 6 illustrates the construction in which an end of the elastic member 145 having a steel piece is fitted in the outer body 140 and the inner body 141, to provide the elastic force between the outer body 140 and the inner body 141.

Figure 7A:
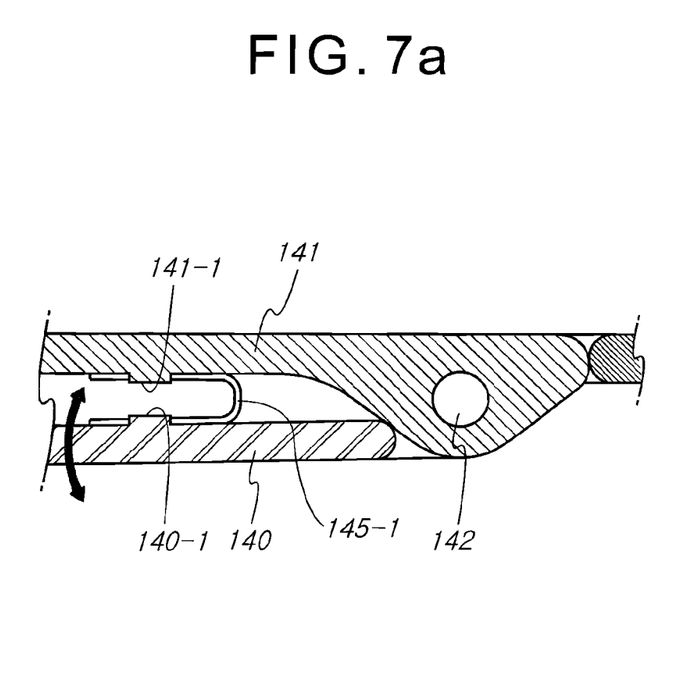
FIG. 7A is an enlarged view illustrating Part D of FIG. 6 according to a modification of the embodiment of FIG. 6.

FIG. 7A illustrates the construction of the leaf spring 145-1 in part D of FIG. 6, in which an end of the leaf spring 145-1 having an U-shape is fitted and fixed in holding channels 140-1 and 141-1 protruding, while facing each other, from the outer body 140 and the inner body 141 that are axially connected with each other by the hinge 142.

Figure 7B:
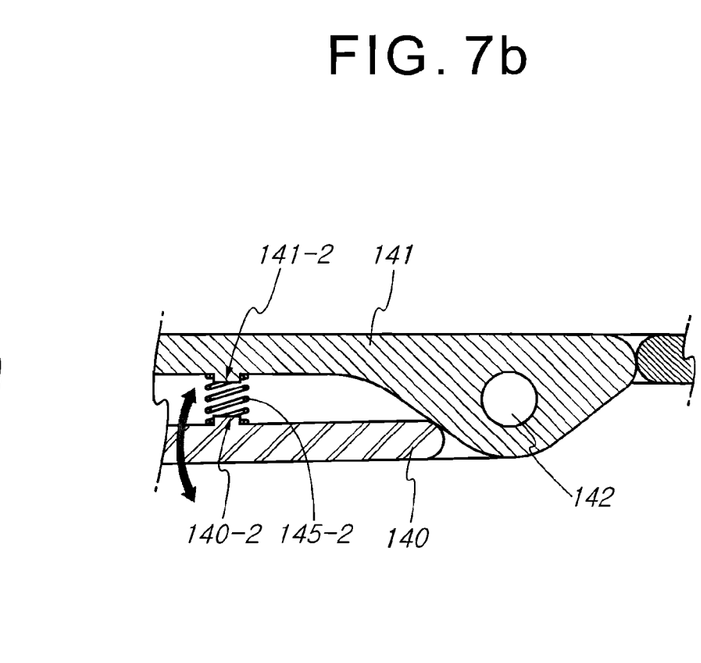
FIG. 7B is an enlarged view illustrating Part D of FIG. 6 according to another modification of the embodiment of FIG. 6.

FIG. 7B illustrates the construction of a coil spring 145-2 in Part D of FIG. 6, in which the coil spring 145-2 is disposed between supporting pins 140-2 and 141-2 protruding, while facing each other, from the outer body 140 and the inner body 141 that are axially connected with each other by the hinge 142.

Hereinafter, the description will be given on the use state of the side shield 100 for the eyewear 101 according to the present invention.

First, the eyewear temple 102 is inserted in the guide groove 115 included in the coupler 111 of the coupling means 110 formed at the shield body 106 of the side shield 100. At this time, in order to prevent the eyewear temple 102 from being interfered with the temple supporting part 116 that is integrally formed with the guide groove 115, the eyewear temple 102 is inclinedly inserted in the guide groove 115 and then the side shield 100 slidably moves in a direction of the hinge 104 or the eyewear 101 slidably moves toward the side shield 100.

Then, an external side of a flat surface of the eyewear temple 102 is in contact with a bottom of the guide groove 115 and an edge of an internal side of the flat surface of the eyewear temple 102 is latched by 4 temple supporting parts 116 formed at the guide groove 115, so that it is possible to maintain the supporting state of the eyewear temple 102.

In this state, if the fastener 112 is strongly pushed after being in contact with the coupler 111, the latching hook 123 formed at the fastening arm 122 is latched by the latching jaw 117 formed at the temple supporting part 116 and this latching state is maintained, so that it is possible to prevent the eyewear temple 102 from being separated from the side shield 100.

The slots 121 are formed at both sides of the fastener body 120 of the fastener 112, so that the fastening arm 122 has an elastic force. Therefore, when the fastener 112 is strongly pushed inward, the fastening arm 122 enters the slots 121 while being temporarily shrunk inward. As soon as the fastening arm 122 enters the slots 121, the fastener 112 is restored to its original state by the elasticity. As a result, the latching hook 123 formed integrally with the fastening arm 122 can be latched by the latching jaw 117.

Further, the pressing projection 125 formed at an inside of the center part of the fastener body 120 is positioned in the pressing groove 126 formed at the eyewear temple 102 so that it is possible to prevent the eyewear temple 102 from sliding and moving.

In order to separate the side shield 100 from the eyewear 101, if the user presses the fastening arm 122 using a tool, such as a long nose plier, and simultaneously makes the fastening arm 122 be shrunk inward, the latching hook 123 is separated from the latching jaw 117. At this time, if the user pulls the fastener 112, the latching hook 123 is easily separated from the latching jaw 117 so that it is possible to separate the side shield 100 from the eyewear 101.

If the user outwardly widens the eyewear temple 102 for wearing the eyewear 101 assembled with the side shield 100, the shield body 106 including the fixing body 130 and the movable body 131 or the outer body 140 and the inner body 141 is assembled with the eyewear temple 102 by the hinge body 132 positioned in the identical line with the hinge 104 of the eyewear 101 or the hinge 142, so that the movable body 131 or the inner body 141 assembled with the eyewear temple 102 widens together with the eyewear temple 102.

Therefore, there is no special difficulty in wearing and taking off the eyewear 101 if the side shield 100 is assembled with the eyewear 101, and it is possible to maintain the widened state of the eyewear temple 102 or the original state of the eyewear temple 102 according to the physical characteristic during when the wearer wears the eyewear 101, so that it is possible to improve the wearing comfort.

Especially, in the shield body 106 including the outer body 140 and the inner body 141, if the impact generated during the direct bump of the foreign substances, etc. is transferred to the outer body 140, the outer body 140 does not transfer the impact to the inner body 141 or the eyewear 101 so that it is possible to further improve the wearing comfort of the eyewear 101.

The above performance can be achieved by the fact that the front end of the inner body 141 positioned in the inside of the outer body 140 and assembled with the eyewear temple 102 is connected with the front end of the outer body 140 by the hinge 142, to move, and the rear end of the outer body 140 is spaced apart from the rear end of the inner body 141 in a predetermined space and this state is maintained.

That is, the rear end of the outer body 140 is spaced apart from the rear end of the inner body 141 so that the eyewear temple 102 widens during the wearing of the eyewear 101. Further, if the external impact is transferred to the outer body 140 when the wearer wears the eyewear 101, the separated space is shrunk so that it is possible to absorb the impact.

Further, if the front ends of the outer body 140 and the inner body 141 are connected to each other by the hinge 142, the outer body 140 and the inner body 141 may easily move. However, the shield body 106 further includes the elastic member 145 so that the rotation is achieved by the hinge 142 while providing the predetermined elastic force to the outer body 140 and the inner body 141, thereby enabling the user to closely wear the eyewear 101 without discomfort on the face of the wearer.

Therefore, the side shield according to the present invention can be easily assembled with and separated from the eyewear temple, widen together with the eyewear temple, and preventing the external impact from being transferred to the eyewear, thereby improving the conveniences of the wearers.

Accordingly, the present invention improves the fastener that assembles the side shield with the eyewear temple so that the side shield is easily assembled with and separated from the eyewear temple and the eyewear temple can outwardly widen even when the eyewear is assembled with the side shield, thereby improving the wearing comfort and preventing the external impact transferred to the side shield from reaching the eyewear, to secure the safety of the wearer of the eyewear.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A side shield for an eyewear comprising:
a shield body surrounding a hinge, through which an eyewear temple is connected with an eyewear frame of an eyewear, and covering a side space of the eyewear frame, to prevent foreign substances from entering the eyes, the shield body comprising blocking wings formed at an upper part and a lower part of the shield body; and
a coupling means for maintaining a coupling state between the shield body and the eyewear temple, the coupling means being provided at the shield body and comprising a coupler assembled with the eyewear temple and a fastener for fastening the coupler,
wherein the coupler comprises a guide groove formed at an inner surface of the shield body, the eyewear temple being slidably assembled with the guide groove, temple support parts formed at upper and lower inner surfaces of a rear part of the guide groove while being spaced from and facing each other, the temple support parts being in contact with a widthwise edge of the eyewear temple slidably assembled with the guide groove, so as to support the eyewear temple, and a latching jaw formed within an upper part of the temple support part to hold the fastener assembled with the coupler within the shield body, and the fastener comprises slots formed at both sides of a fastener body, a fastening arm protruding with elasticity from the slots, and a latching hook formed at an end of the fastening arm and latched by the latching jaw, to prevent the shield body from being separated from the eyewear temple.

2. The side shield for the eyewear as claimed in claim 1, further comprising a pressing projection formed at an inner surface of a center part of the fastener body so that the pressing projection is fitted in a pressing groove formed at the eyewear temple, to prevent the eyewear temple from moving.

3. The side shield for the eyewear as claimed in claim 1, wherein the shield body comprises a fixing body that is in close contact with the eyewear frame and does not move and a movable body that is assembled with the eyewear temple and freely widens outward together with the eyewear temple, in which the fixing body is assembled with the movable body by a hinge body positioned in an identical line with a hinge of the eyewear and the hinge body comprises a stopper for controlling unnecessary widening of the movable body.

4. The side shield for the eyewear as claimed in claim 1, wherein the shield body comprises an outer body for protecting against external impact and foreign substances and an inner body positioned in an inner side of the outer body and assembled with the eyewear temple, so as to freely widen outward together with the eyewear temple, in which a front end of the inner body is assembled with a front end of the outer body by a hinge so that they are free rotatably connected with each other while freely rotating, and a rear end of the inner body is spaced apart from the outer body in a predetermined distance, in order to prevent the inner body from being interfered with the outer body during the widening of the eyewear temple.

5. The side shield for the eyewear as claimed in claim 4, further comprising an elastic member between the inner body and the outer body in order to provide elastic force for controlling unnecessary movement of the outer body with respect to the inner body.

6. The side shield for the eyewear as claimed in claim 5, wherein the elastic member between the inner body and the outer body comprises a plate-shaped steel piece, which has an end fixedly fitted in the outer body and the inner body that are connected to a hinge shaft.

7. The side shield for the eyewear as claimed in claim 6, wherein the elastic member between the inner body and the outer body comprises a U-shaped leaf spring, which has ends fixedly fitted in holding channels that are formed at the outer body and the inner body, respectively, while facing each other.

8. The side shield for the eyewear as claimed in claim 6, wherein the elastic member between the inner body and the outer body comprises a coil spring disposed between supporting pins that are formed between the outer body and the inner body, respectively, while facing each other.

* * * * *